United States Patent
Terlizzi et al.

(10) Patent No.: US 7,380,705 B2
(45) Date of Patent: Jun. 3, 2008

(54) MULTI-INTERFACE DATA ACQUISITION SYSTEM AND METHOD THEREOF

(75) Inventors: Jeffrey J. Terlizzi, San Francisco, CA (US); Rizwan Ahmad Alladin, N. Babylon, NY (US); Tong-Hsiao Chang, Westbury, NY (US); John Joseph Fioriglio, Rocky Point, NY (US); Peter Musteric, E. Setauket, NY (US); Robert W. DiGiovanna, Shirley, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/650,182

(22) Filed: Aug. 28, 2003

(65) Prior Publication Data
US 2005/0045726 A1    Mar. 3, 2005

(51) Int. Cl.
*G06F 17/00*    (2006.01)
(52) U.S. Cl. ............. 235/262.15; 235/454; 235/462.01
(58) Field of Classification Search ........... 235/462.15, 235/462.43, 462.45, 462.47, 472.01, 454, 235/462.01; 710/63, 64
See application file for complete search history.

(56) References Cited

U.S. PATENT DOCUMENTS

| 5,258,604 A | 11/1993 | Behrens et al. ........ 235/462.15 |
| 5,579,489 A | 11/1996 | Dornier et al. |
| 5,703,347 A * | 12/1997 | Reddersen et al. .... 235/462.15 |
| 5,832,244 A | 11/1998 | Jolley et al. |
| 5,905,249 A * | 5/1999 | Reddersen et al. .... 235/462.15 |
| 6,115,678 A * | 9/2000 | Lieb et al. ................... 702/122 |
| 6,415,341 B1 | 7/2002 | Fry, Sr. et al. |
| 6,705,527 B1 * | 3/2004 | Kelly et al. ............ 235/472.01 |
| 2002/0038378 A1 | 3/2002 | Simmon et al. |
| 2003/0121981 A1 * | 7/2003 | Slutsky et al. ......... 235/462.45 |

FOREIGN PATENT DOCUMENTS

WO    WO 99/22305    5/1999

OTHER PUBLICATIONS

Wikipedia article "Flash memory" available at http://www.wikipedia.org. Retrieved Mar. 17, 2007.*
Symbol Product Reference Guide, LS 2501, First Ed., Mar. 1991.
PCT International Preliminary Examination Report, PCT/IPEA/416 and 409 dated May 16, 2006.
International Search Report (4 pages).

* cited by examiner

*Primary Examiner*—Daniel Hess
(74) *Attorney, Agent, or Firm*—Carter, DeLuca, Farrell & Schmidt, LLP (57) ABSTRACT

A system and method for interfacing a data acquisition device to a host device via a plurality of interfaces are provided. The present invention is enabled by a multi-interface controller which enables the data acquisition device to interface to a plurality of host devices having different interfaces e.g., RS232, USB, keyboard wedge, IBM4683, wand emulation, synapse, undecoded, etc. The interface controller includes a microcomputer for translating received data from the data acquisition device and outputting a host device type signal; and a switching circuit for electrically coupling the microcomputer to the at least one host device based on the host device type signal and transmitting the received data to the host device.

25 Claims, 9 Drawing Sheets

| pin # | RS-232 | USB | Synapse | Wand Emulation | Keyboard Wedge | IBM 468x | Undecoded | RS232 Download | USB Download |
|---|---|---|---|---|---|---|---|---|---|
| 1 | | jumper to 6(1) | SYN_CLK | | | | DBP | | jumper to 6(1) |
| 2 | +5V | +5V | +5V | +5V | +5V | +5V | +5V | +5V | +5V |
| 3 | GND | GND | GND | GND | GND | GND | GND | GND | GND |
| 4 | TXD | | | WAND_DBP | KBD_CLK | IBM_A | ENABLE | TXD | |
| 5 | RXD | D+ | | WAND_CTS | TERM_DAT | IBM_B | SOS | | D+ |
| 6 | RTS | jumper to 1 | SYN_DAT | WAND_RTS | KBD_DAT | | TRIG | RXD | jumper to 1 |
| 7 | CTS | D− | | | TERM_CLK | | DECODE | | D− |
| 8 | | | | | | | | Tied to +5V | |
| 9 | Reserved for EAS | | | | | | | | |
| 10 | | | | | | | | | |

MULTI-INTERFACE DATA ACQUISITION SYSTEM AND METHOD THEREOF

BACKGROUND OF THE INVENTION

1. Field of the Invention

The present invention relates generally to a data acquisition system, and more particularly, to a system and method for interfacing a data acquisition device to a host device via a plurality of interfaces.

2. Description of the Related Art

Various types of data acquisition devices exist which allow a user to collect and transmit data to a host computing device. Data acquisition devices may be terminals, with keypad entry means and a display. In addition, data acquisition devices may be bar code scanners in a stand alone configuration or integrated with a terminal. Various types of bar code scanning devices are known in the art which optically scan a bar code printed on a substrate for capture of data encoded in the bar code. Laser bar code scanning devices use a laser light source such as a visible laser diode to scan the bar code by sweeping the laser source across the bar code with a mechanically oscillating reflecting element such as a mirror. The light reflected from the bar code is collected by a photosensor directly from the bar code or retroreflectively off of a portion of the scanning mirror. The analog waveform output by the photosensor has an amplitude which represents the amount of laser light reflected off the bar code. Thus, the varying amplitude of the analog waveform represents the relative spacing of the various bars and spaces of the bar code, which in turn represents the data encoded therein. The analog signal is processed, digitized and decoded into data representative of that which had been encoded into the target bar code.

Bar code scanning devices are also known in the art which are based on solid state imagers such as charge coupled devices (CCDs). CCD based bar code readers are either one-dimensional or two-dimensional. One-dimensional CCD bar code scanners use a linear array of photosensors to capture an image of a cross section of the entire linear bar code at once and produce an analog waveform whose amplitude is representative of the darkness and lightness of the bars and spaces of the captured image. The electric charge stored in each element of the CCD array as a function of the amount of light sensed by an area covered by each element is shifted out serially to form electric signals for further processing, digitizing and decoding. Two dimensional CCD bar code readers operate similarly to capture an image of an entire two-dimensional bar code symbol at once and process it accordingly. The waveform is digitized and decoded in a means similar to laser scanners.

The decoded signals are typically transmitted to a host device for processing, storage, and the like. Many types of host devices exist, depending on the particular application desired by the user. For example, scanners are used at POS cash register terminals to scan in the bar code of a product, where the terminal uses the bar code data as a pointer to look up the price and item description in memory. Scanners are also used to interface to personal computers with keyboard wedges, where the scanner is inserted in the path between the keyboard and the computer, and the scanner input must be configured to appear the same to the computer as keyed input from the keyboard. Scanners are also used to drive RS-232 computer interfaces in other applications.

In most cases, each different type of host device implements a different type of input/output interface, thus requiring different mechanical connectors, different electrical and data formats and protocols, etc. depending on the user's application. Prior art devices were thus usually configured by the manufacturer to interface with one or more host devices. This custom type of scanner-host device matching is costly and inefficient.

In U.S. Pat. No. 5,258,604, a system is suggested which implements a bar code scanning device which is configured to accept any of a plurality of differently configured interface boards in its handle, wherein each type of interface board is specially adapted to mate with an associated host device. The decoder in the scanner polls the interface board upon power-up and reads an identification code from the particular interface board which the user has inserted. The identification code is used by the decoder to access configuration and formatting data from an on-board memory in order to transmit data to the interface board and ultimately to the host device in the required manner. This requires a user to have to swap electrical boards inside the scanner device whenever he desires to use the scanner with a different host device, which is unwieldy and potentially damaging to the boards due to electrostatic discharge (ESD) phenomena. In addition, when a new type of host device is desired to be used with a scanner already in use in the field, the scanner must be physically reconfigured in order to be able to recognize a new identification code from a new type of interface board and to properly format the decoded data for transfer to the new type of host device.

It is also desired in the field of data acquisition such as bar code scanning to be able to use a particular data acquisition device with different host devices at different times by simply connecting the data acquisition device to the host device in a "plug and play" environment, without having to physically reconfigure the data acquisition device with different internal interface boards as in the prior art. This may occur, for example, with a data acquisition device that is used to scan bar codes during the daytime at a POS terminal, and then is used at night time for inventory collection purposes in a storage room with a different host device.

SUMMARY OF THE INVENTION

A system and method for interfacing a data acquisition device to a host device via a plurality of interfaces are provided. The present invention is enabled by a multi-interface controller which enables the data acquisition device to interface to a plurality of host devices having different interfaces, e.g., RS232, USB, keyboard wedge, IBM4683, wand emulation, synapse, undecoded, etc.

According to one aspect of the present invention, an interface controller for interfacing a data acquisition device to at least one host device is provided. The interface controller comprises a microcomputer for translating received data from the data acquisition device and outputting a host device type signal; and a switching circuit for electrically coupling the microcomputer to the at least one host device based on the host device type signal and transmitting the received data to the host device.

In another aspect of the present invention, a data acquisition device comprises a scan engine for optically acquiring encoded data from a substrate; a decoder for receiving input data from the scan engine and decoding the received input data according to a predetermined symbology; and an interface controller for interfacing the data acquisition device to at least one host device based on a type of the at least one host device.

In a further aspect of the present invention, a data acquisition system is provided comprising a data acquisition device for acquiring data from a substrate; at least one host device for receiving and processing the acquired data; and an interface controller for interfacing the data acquisition device to at least one host device based on a type of the at least one host device.

In another aspect of the present invention, a method for interfacing a data acquisition device to at least one host device is provided, the method comprising the steps of coupling the data acquisition device to the at least one host device with an interface controller; determining a type of the at least one host device; and configuring the interface controller based on the type of the at least one host device.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF PREFERRED EMBODIMENTS

Preferred embodiments of the present invention will be described hereinbelow with reference to the accompanying drawings. In the following description, well-known functions or constructions are not described in detail to avoid obscuring the invention in unnecessary detail.

Figure 1:
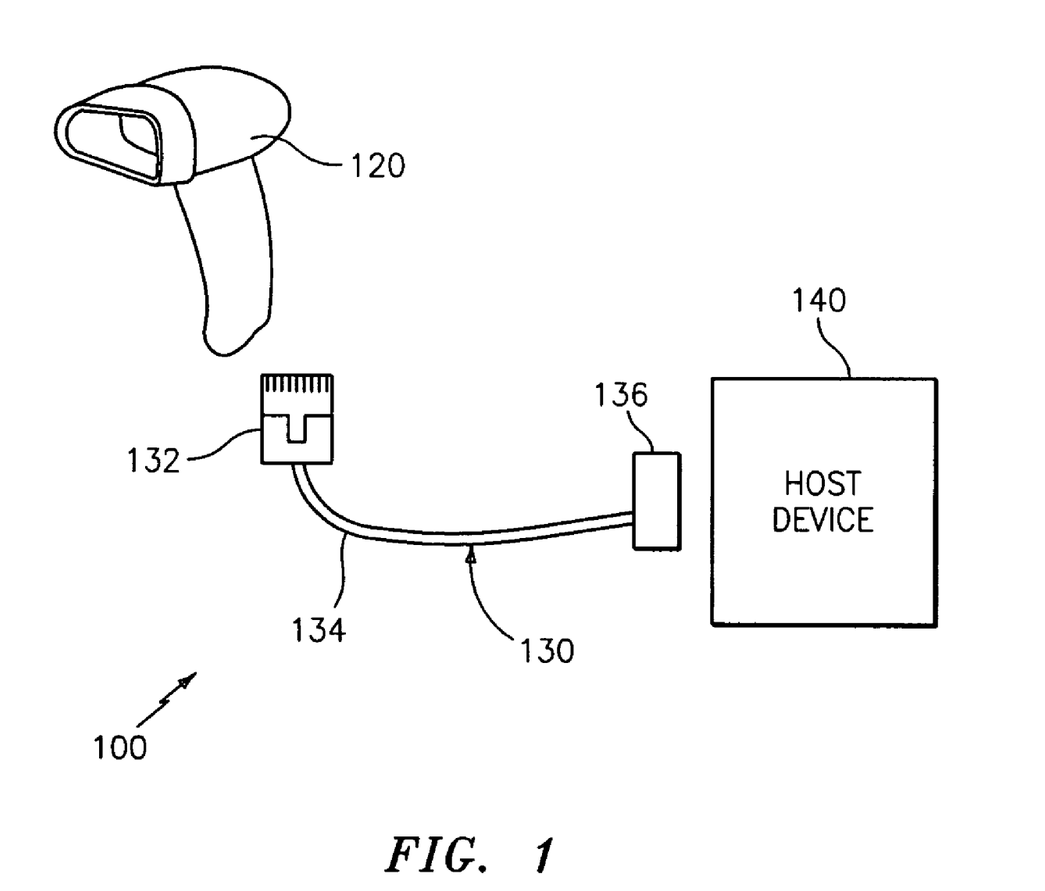
FIG. 1 is an exemplary data acquisition system employing a multi-interface controller in accordance with the present invention.

Referring to FIG. 1, a data acquisition system 100 in accordance with the present invention is provided. Generally, the data acquisition system 100 includes a data acquisition device 120, a host interface cable 130, and a host device 140. The host device 140 may be any type of computing device known in the art which is configured to accept data input in any type of format, such as a computer with an RS-232 communications port or USB communication port, an Optically Coupled Interface Adapter device (OCIA), a keyboard wedge configuration (as in a personal computer), or an IBM 4683 POS device, any of which will accept bar code data obtained when the data acquisition device 120 implements bar code scanning (or acquires data by other means such as magnetic stripe reading, keyed input, etc.).

The data acquisition device 120 in one embodiment is a scanner integrated terminal and comprises a bar code scan engine and a decoder. The bar code scan engine may be of any type known in the art as described above which produces a digitized signal (digital bar pattern DBP) which is representative of the relative spacing of the bars and spaces of the bar code which is scanned. The decoder may also be of any type known in the art which operates on the digital bar pattern via various algorithms stored in an associated memory to decode the digital bar pattern to a digital data signal in accordance with the particular symbology being implemented. The decoder may be configured to decode bar code symbols in any one symbology desired, or it may be configured in an autodiscrimination mode to automatically detect and decode bar codes of more than one symbology and provide the digital data accordingly.

The host interface cable 130 includes a data acquisition device coupler 132 for coupling the interface cable 130 to the data acquisition device 120, a plurality of electrical conductors 134 for transmitting and receiving information to and from the host device 140 and a host-specific coupler 136 for coupling the interface cable 130 to the host device 140. Preferably, the data acquisition device coupler 132 is a ten pin RJ45-type connector. It is to be understood that each host will require a differently configured host-specific coupler 136.

Figure 2:
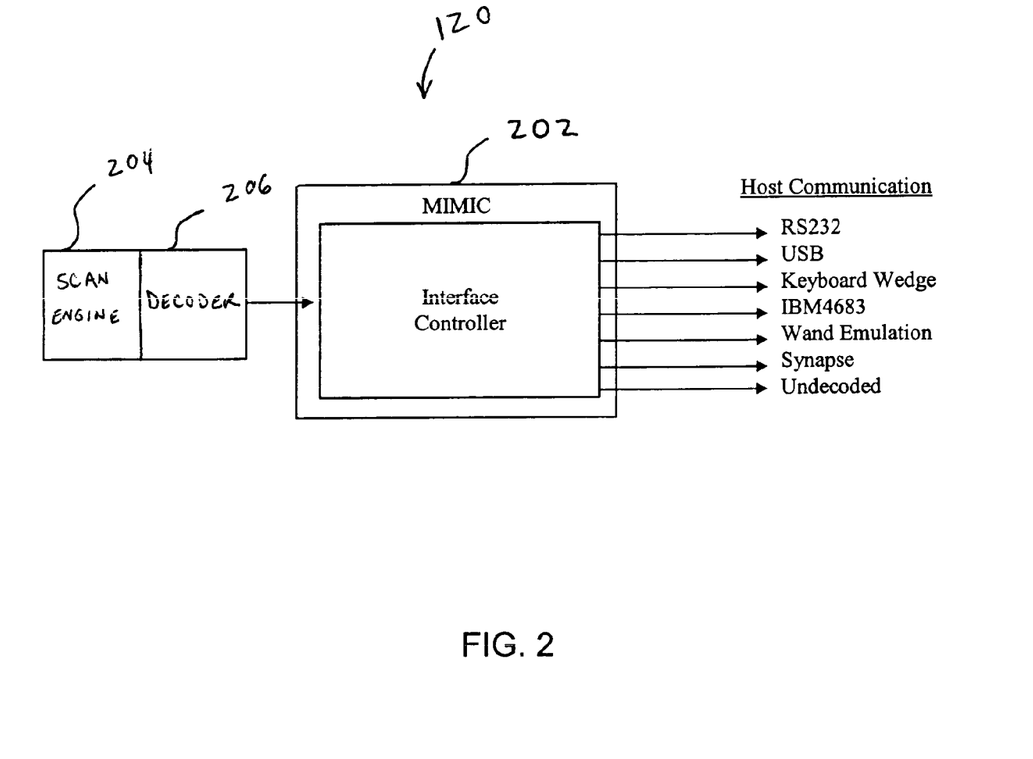
FIG. 2 is a block diagram of a data acquisition device according to an embodiment of the present invention.

Referring to FIG. 2, a data acquisition device 120 including a multi-interface controller 202 according to an embodiment of the present invention is shown. In this embodiment, the multi-interface controller 202 is included in a housing with the scan engine 204 and decoder 206. The decoder 206 will send signals indicative of a bar code or symbol read to the multi-interface controller 202. The multi-interface controller 202 will translate the received data signal into a format required by the host device 140 and transmit the translated data to the host device over appropriately configured interface circuitry as will be described below.

Figure 3:
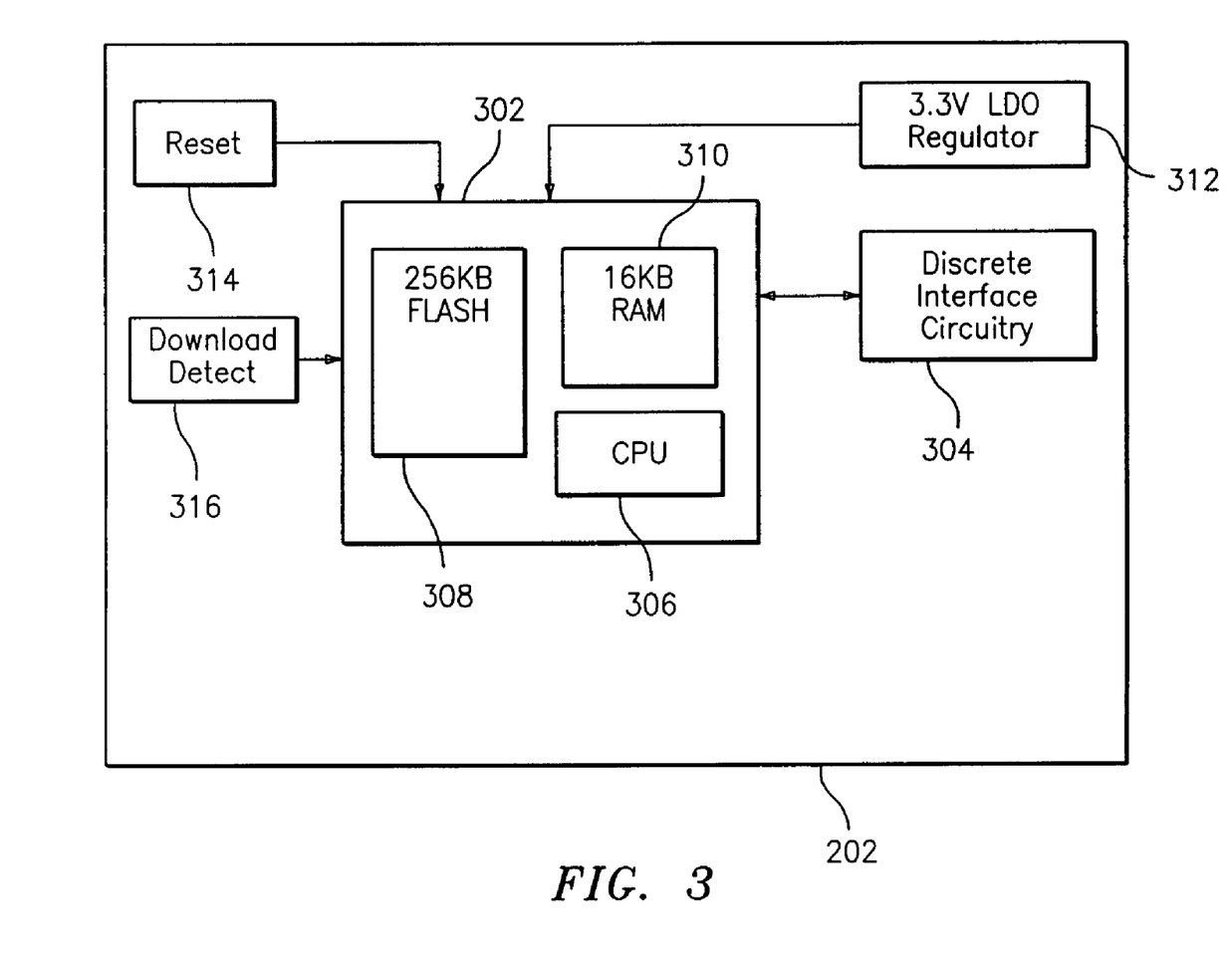
FIG. 3 is a block diagram of a multi-interface controller in accordance with the present invention.

FIG. 3 is a block diagram illustrating the multi-interface controller 202. The multi-interface controller 202 includes a microcomputer 302 for translating received data from a data acquisition device and for configuring the controller 202 to interface to a specific host device 140 and discrete interface circuitry 304 for connecting the microcomputer 302 to a plurality of host devices. The microcomputer 302 includes a central processing unit (CPU) 306 for executing instructions and controlling the overall functioning of the interface controller 202, a Flash memory 308 for storing instructions and data translation modules and RAM memory 310 for use during the execution of processes. The Flash memory 308 will store the program instruction set for enabling the configuration of the interface circuitry 304. The Flash memory 308 will also store a plurality of translation modules for translating data received by the microcomputer 302 from the data acquisition device 120 to a format required by the host device 140. The number of translation modules will equal a number of possible host devices connectable by the interface circuitry 304.

The microcomputer 302 will also include the necessary peripheral function blocks for communicating with a plurality of host devices. For example, the microcomputer will include three serial communication interface (SCI) ports for serial communications, a USB transceiver and USB module to process standard USB commands which allows the microcomputer 302 to tend to other tasks while attached to a USB host device, a direct memory access (DMA) controller, and a data transfer controller (DTC) for automated transfer of data for background loading of captured barcode data.

To ensure proper operation of the microcomputer 302, the multi-interface controller 202 will include a voltage regulator 312 for regulating a power supply voltage provided to the microcomputer 302 and a reset circuit 314 for monitoring the power supply voltage and providing a reset signal to the microcomputer 302 whenever the power supply voltage falls below a predetermined threshold.

Figure 5:
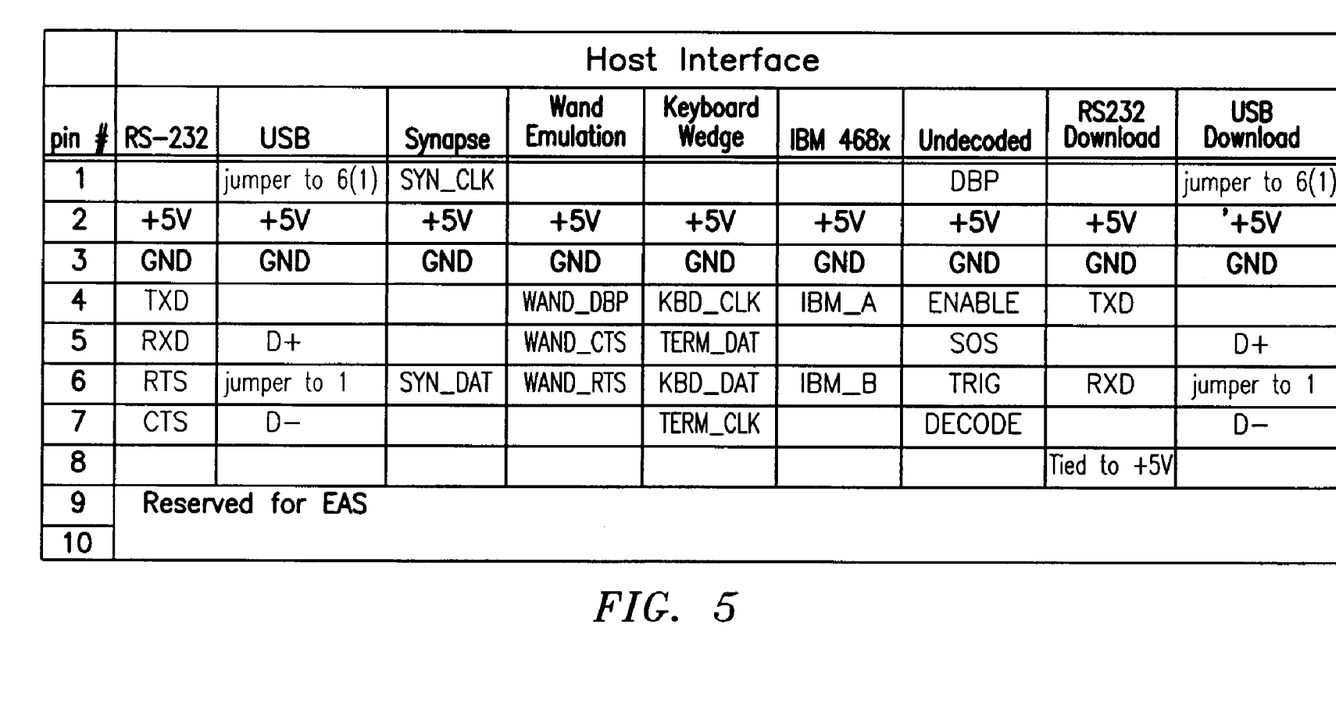
FIG. 5 is a table illustrating a pinout scheme for an interface cable employed to couple a multi-interface controller to a host device in accordance with the present invention.

Furthermore, the multi-interface controller 202 will include a download detect circuit 316 for downloading the program instructions for the microcomputer 302. A FLASH download procedure is initiated when a download cable is connected to the multi-interface controller 202. The download cable's configuration is illustrated in FIG. 5. The download cable has the DOWNLOAD signal (pin 8 on the RJ45 connector) connected to the power supply voltage $V_{CC}$. When the download cable is connected the download detect circuit 316, the signal is buffered and inverted and sent to the microcomputer 302. This signals the microcomputer 302 to enter a boot loader program that will subsequently configure the multi-interface controller 202 for RS232 communication, and program data is passed to the microcomputer 302 over that serial link.

The microcomputer 302 will determine a type of host device to be interface to in two ways. First, the host type will be auto-detected upon connecting the host interface cable 130 to the host device 140. For example, when connecting to a host device using a USB or synapse interface, the microcomputer 302 will automatically determine the type of host device connected. Alternatively, the data acquisition device will scan a bar code or other symbology and send a host device type signal to the microcomputer 302. Furthermore, a default host type can also be preconfigured with application software e.g. "123Scan" software commercially available from Symbol Technologies of Holtsville, N.Y.

Once the microcomputer 302 has determined the type of host device connected, the microcomputer 302 will send the host device type signal to the interface circuitry 304 for configuring the multi-interface controller 202 for the specific host device.

Figure 4:
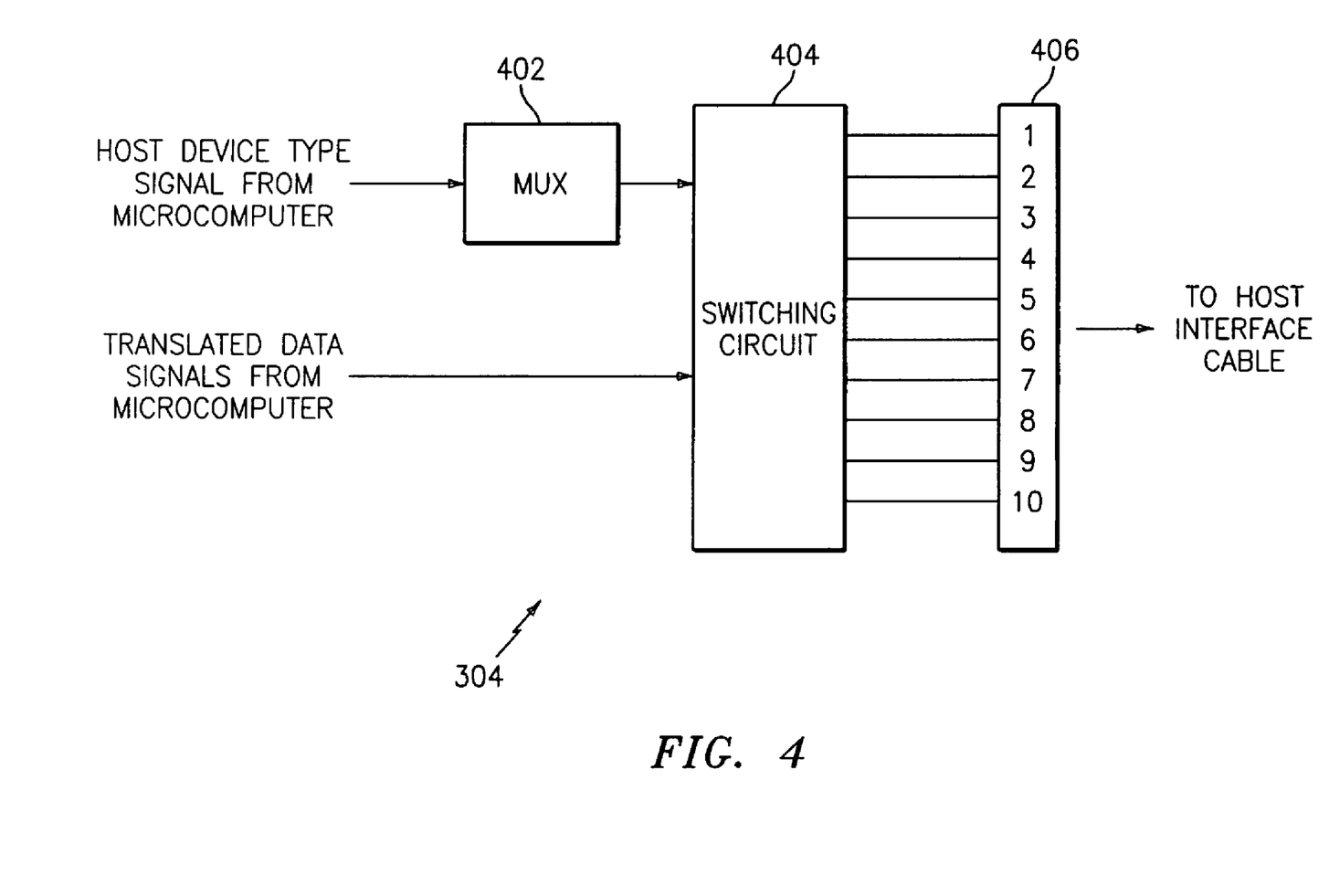
FIG. 4 is a block diagram of a discrete interface circuitry in accordance with the present invention.

Referring to FIG. 4, the interface circuitry 304 includes a multiplexer 402 and a switching circuit 404. The multiplexer 402 receives the host device type signal from the microcomputer and outputs a plurality of signals relating to the host device type to the switching circuit 404. The switching circuit 404 includes a plurality of switches, e.g., transistors, for coupling host-specific outputs from the microcomputer 302 to an output connector 406. Preferably, the output connector 406 is configured to accept a RJ45-type connector. Additionally, the switching circuit 404 includes a plurality of drivers for driving output signals to appropriate voltage levels.

Once the switching circuit 404 has been configured for a specific host device, the data acquisition device will communicate to the host device 140 over a specific host interface cable 130. FIG. 5 is a table illustrating a pinout scheme for the host interface cable 130 in accordance with the present invention. Preferably, all cables will terminate on one end with a ten pin RJ45-type connector and on the other end with a host-specific connector.

Figure 6A:
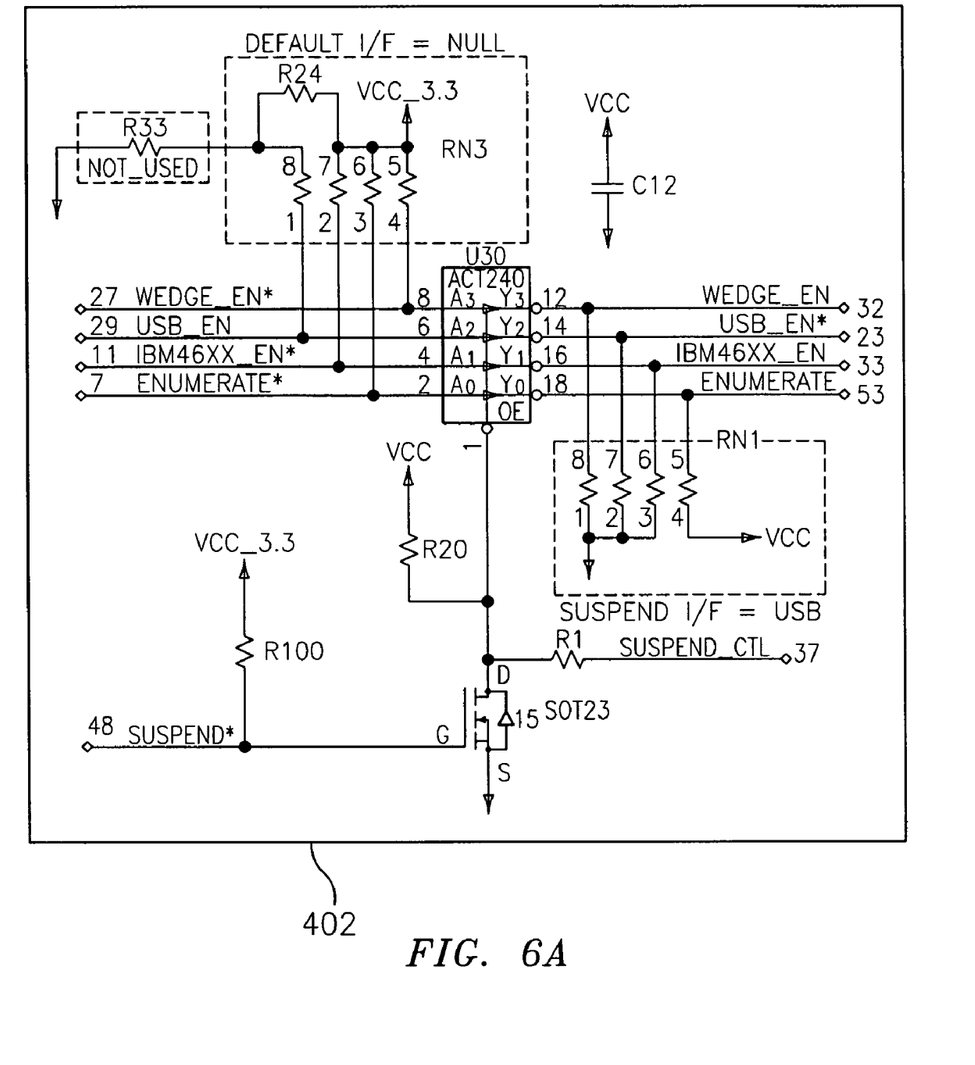
FIG. 6 is a schematic diagram of the multiplexer and switching circuit shown in FIG. 4.
Figure 6B:
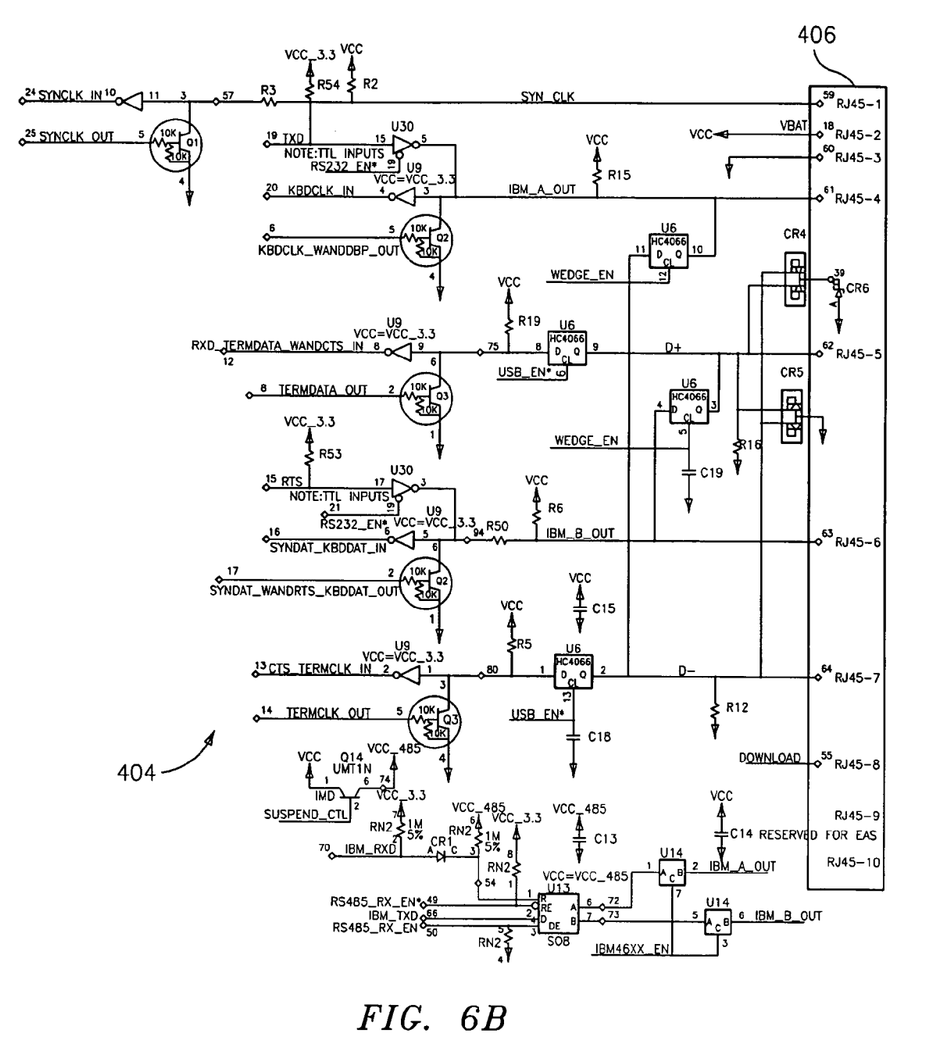

Operations of the multiplexer 402 and switching circuit 404 will now be described in detail with reference to FIG. 6, where FIG. 6 is a schematic diagram of the multiplexer 402 and switching circuit 404 of FIG. 4.

The multiplexer 402 and switching circuit 404 enables one printed circuit board (PCB) configuration to support a plurality of interfaces, e.g., RS232 (TTL), USB, Synapse, Wand, Keyboard Wedge and IBM 468X/9X, and communications via each of the plurality of interfaces.

RS232 Interface

The multi-interface controller 202 is configured for a RS232 host device when the "RS232—Standard Host" parameter bar code is scanned. A RS232 host interface cable is also required to connect to the host correctly, the configuration of which is shown in FIG. 5.

When configured for an RS232 host device, the multi-interface controller 202 communicates via 4 signals:
TXD
RXD_TERMDATA_WANDCTS_IN
RTS
CTS_TERMCLK_IN.

Once the control signal RS232_EN* is driven low via the microcomputer 302, inverting line driver U30 (gates at pins 11 & 9 and pins 13 & 7) is activated allowing for communication on the TXD and RTS from the microcomputer 302 to the host device. The driver U30 is a TTL to CMOS inverting line driver with output enable. The driver U30 has two sets of four inverting gates with an output enable for each set of four. The remaining two inverter gates controlled by RS232_EN* are used for voltage level translation since the interface circuitry 304 communicates to the host device at 5V levels and the microcomputer 302 operates at 3.3V. Also note that the additional set (U30 pins: 8 & 12, 6 & 14, 4 & 16, 2 & 18) are used for 3.3V to 5V level translation.

Based on the standard RS232 specification host transceivers can be transmitting up to +/−25V, thus circuit protection is required for integrated circuits operating off of the +5V rail. Pins 2, 3 9, & 10 of switch U6 and pins 2 & 6 of switch U14 are protected by voltage clamping circuitry. The voltage clamp circuit is comprised of zener diode CR6 and schotky diodes CR4 and CR5. Voltage at output connector J1 pins 5 and 7 will be clamped to approximately ground and 5V. Current limit through the clamp circuit is based on the output impedance of the RS232 driver. This impedance is specified as a minimum of 300 Ohms and is typically in the order of multiple MOhms.

USB Interface

As shown in FIG. 5, the USB host interface cable has a jumper (electrical short) between pins 1 and 6. Upon power up, the microcomputer 302 does a loop back test to determine if this connection is present. This is done by toggling the SYNCLK_OUT signal and reading SYNDAT_KBDDAT_IN. Once it has been determined that the multi-interface controller 202 is connected to a host device via the USB cable, the microcomputer 302 configures the multiplexer from NULL HOST to USB HOST. The USB_EN signal isolates the D+ and D− lines from all multiplexing circuitry via the analog switch (U6) and the ENUMERATE* signal connects the D+ pull-up and transceiver to the host device. This indicates to the host device that a device, or in this case the multi-interface controller 202, is present.

Resistors R9 and R10 are chosen to allow for compliance with the USB signal quality tests and also note the bulk board capacitance has been chosen to hold surge currents within the USB surge current requirements.

If the USB Bus state is idle for more than 3 ms, the multi-interface controller 202 is required to go into a suspend mode, drawing less than 500 µA within 10 mS of bus inactivity. The microcomputer 302 must configure all ports to reduce idle current before going into the microcomputer 302 sleep mode. The SUSPEND* signal must be driven low, and all signals driving the TTL to CMOS inverting line driver U30 must be driven low. This disables driver U30 and significantly reduces the device quiescent current and allows the interface controller to comply with a <500 µA suspend current requirement for low power consumption. Also note, resistor network RN1 keeps the multi-interface controller 202 in USB mode while driver U30 is disabled.

Synapse Interface

Synapse is a proprietary interface between a data acquisition device and a Synpase host device. It is a 5V bi-directional signaling scheme. A "1" level is passively generated from a pull-up resistor and the "0" level is actively driven low by a transistor, e.g., a BJT open-collector drive.

When the Synapse host interface cable is plugged in, the microcomputer 302 attempts to automatically identify the Synapse host device by communicating on the following lines:

SYNCLK_IN (input)
SYN_CLK_OUT (output)
SYNDAT_KBDDAT_IN (input)
SYNDAT_WANDRTS_KBDDAT_OUT (output)

The Synapse autodiscrimation process determines if the multi-interface controller 202 is connected to a Synapse host device. Once it completes this process successfully, communication begins on the above signals. Inverters U9:10,11 and U9:1,2 are 5V tolerant inverters and are used to level shift from 5V to 3.3V logic.

Wand Emulation

When configured for Wand Emulation, the multi-interface controller 202 communicates to the host device via 3 signals:

WAND_DBP—KBDCLK_WANDDBP_OUT (output)
WAND_CTS—RXD_TERMDATA_WANDCTS_IN (input)
WAND_RTS—SYNDAT_WANDRTS_KBDDAT_OUT (output)

Keyboard Wedge

When the multi-interface controller 202 is configured for keyboard wedge mode and desires to send data, the microcomputer 302 drives the WEDGE_EN* signal of the multiplexer 402 high and communicates to the host device on the following lines:

KBDCLK_IN (input) and KBDCLK_WANDDBP_OUT (output),
RXD_TERMDATA_WANDCTS_IN (input) and TERMDATA_OUT (output),
SYNDAT_KBDDAT_IN (input) and SYNDAT_WANDRTS_KBD_OUT (output),
CTS_TERMCLK_IN (input) and TERMCLK_OUT (output), When the data acquisition device is not sending data, the WEDGE_EN* is driven low and the analog switches U6:10,11,12 and U6:3,4,5 are closed. This is the pass through mode and allows normal communication to flow between the keyboard and the host device.

IBM 468X

The IBM 468X interface is based on a half duplex RS485 signaling scheme. U13 is a differential bus transceiver and is controlled by the following signals:

IBM46XX_EN*—Is inverted and level shifted by transceiver U30 and ultimately, controls analog switch U14. When enabled analog switch U14 connects the output of transceiver U13 to Pins 4 and 6 of the RJ-45 modular connector, J1.
RS485_RX_EN*—When Low, configures transceiver U13 as a receiver.
RS485_TX_EN—When High, configures transceiver U13 as a transmitter.

Serial communication is done via the following signals:
IBM_RXD
IBM_TXD

Also note, transistor Q14:1,2,6 controls the supply current to transceiver U13. During USB suspend mode, SUSPEND_CTL is pulled high which turns off transistor Q14 and removes the supply voltage from the transceiver U13 (VCC_485). This allows the multi-interface controller 202 to comply with the <500 µA suspend current requirement for low power consumption.

Figure 7:
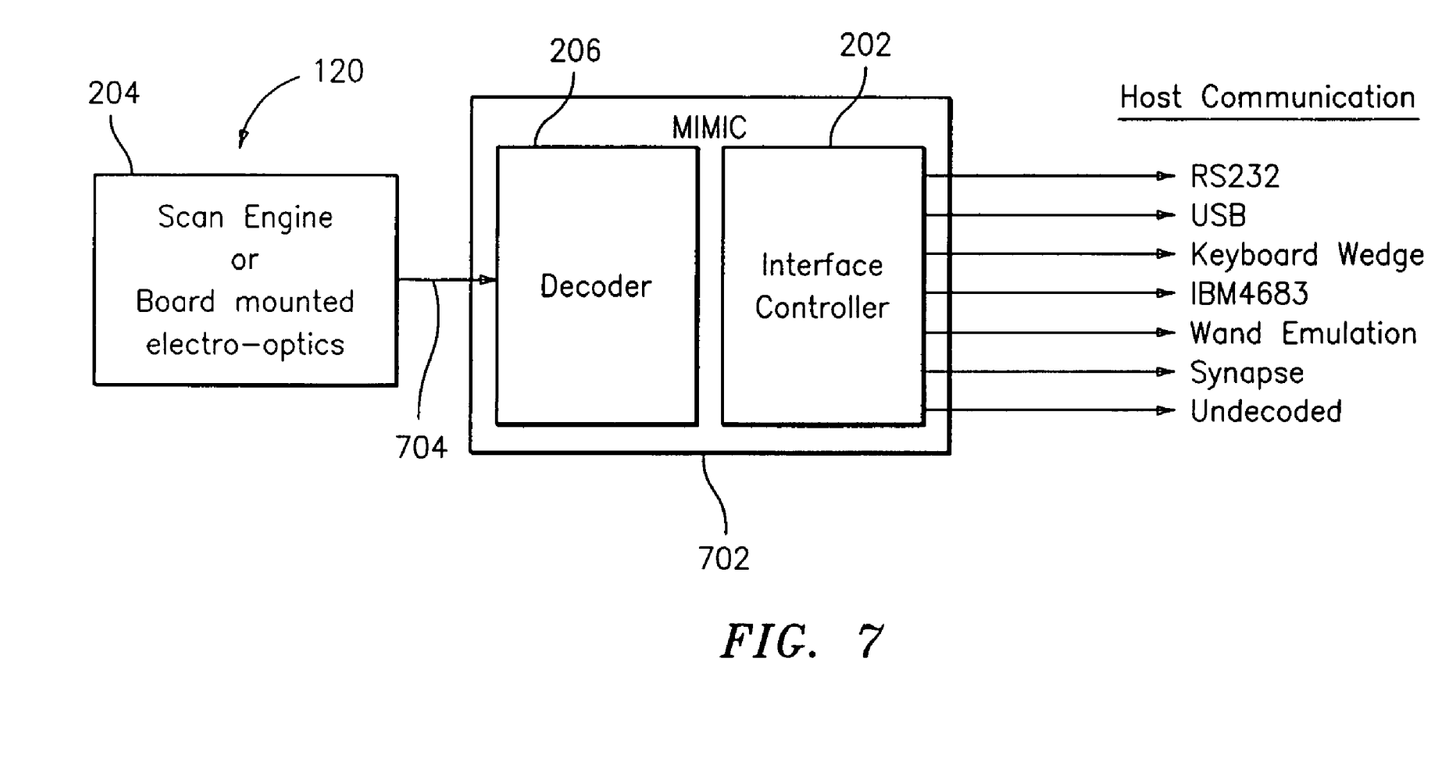
FIG. 7 is a block diagram of a data acquisition device according to another embodiment of the present invention.

FIG. 7 is a block diagram of a data acquisition device according to another embodiment of the present invention. In this embodiment, the data acquisition device 120 includes the scan engine 204 only. The decoder 206 and multi-interface controller 202 are located in a separate housing 702 and are coupled to the data acquisition device 120 via cable 704. All components shown in FIG. 7 function identically to those described above in relation to FIG. 2.

Figure 8:
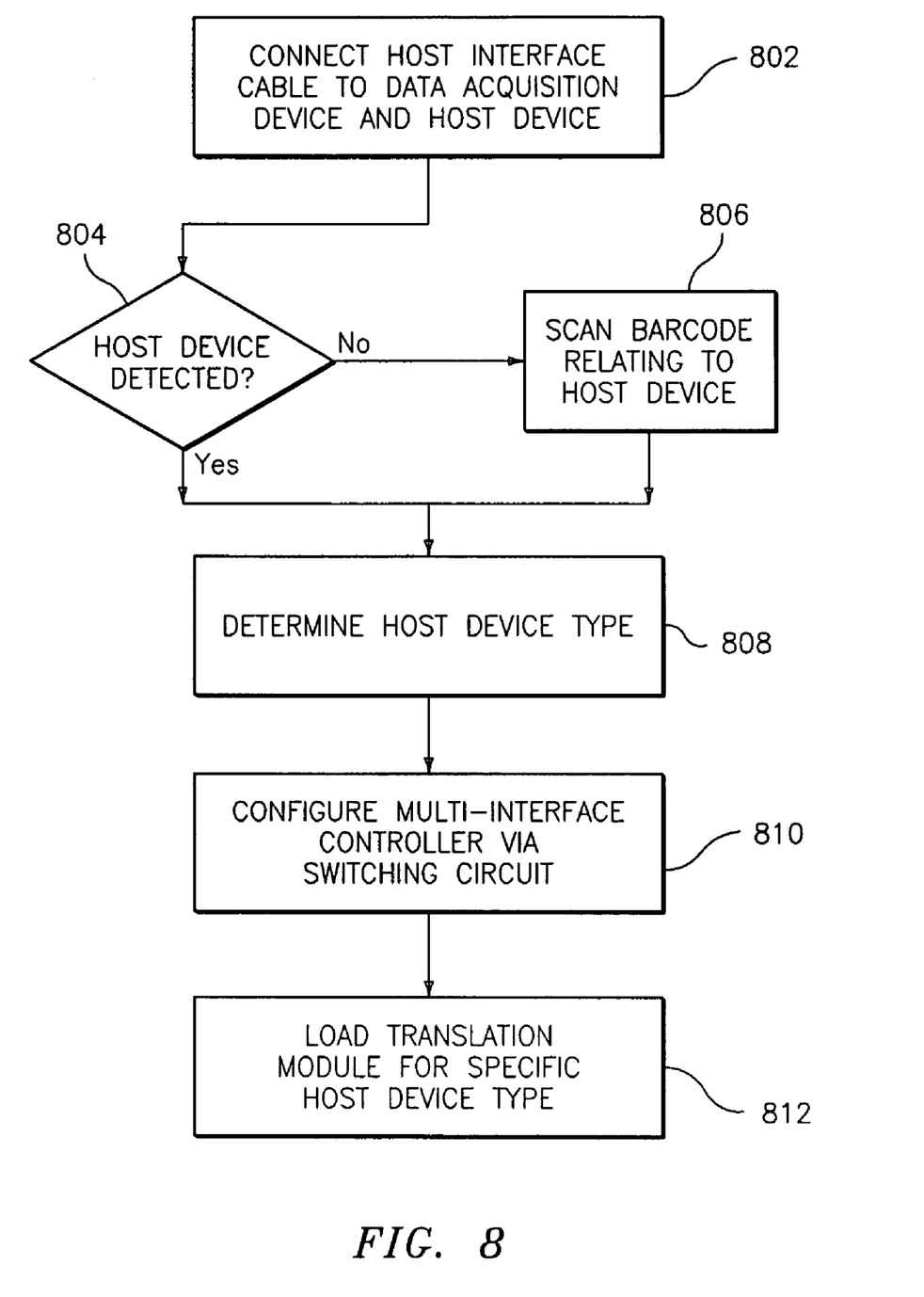
FIG. 8 is a flow chart illustrating a method for interfacing a data acquisition device to a host device.

FIG. 8 is a flow chart illustrating a method for interfacing a data acquisition device to a host device.

Referring to FIG. 8, a data acquisition device 120 is coupled to a host device 140 via host interface cable 130 (step 802). Upon connecting the host interface cable 130, the microcomputer 302 will perform an autodiscriminate routine to detect if a host device 140 is connected (step 804). If a host device 140 is detected, the microcomputer 302 will determine the type of host device (step 808). Otherwise, a user of the data acquisition system may scan a bar code, or other symbology, indicative of the type of host device (step 806) which is then sent to the microcomputer 302.

Once the type of host device connected has been determined (step 808), the microcomputer 302 will send a host device type signal to the interface circuitry 304 for configuring the multi-interface controller 202 (step 810). The multiplexer 402 will receive the host device type signal and outputs a plurality of signals relating to the host device type to the switching circuit 404. The switching circuit 404 then sets the appropriate switches to couple outputs of the microcomputer 302 to the output connector 406 of the interface circuitry 304. Additionally, the microcomputer 302 will load a host-specific translation module from the Flash memory for translating the data received from the data acquisition device 20 to a format required by the host device 140 (step 812).

While the invention has been shown and described with reference to certain preferred embodiments thereof, it will be understood by those skilled in the art that various changes in form and detail may be made therein without departing from the spirit and scope of the invention as defined by the appended claims.

What is claimed is:

1. An interface controller for interfacing a data acquisition device to at least one host device via at least one interface of a plurality of interfaces, the interface controller comprising:

a microcomputer for receiving data acquired by the data acquisition device and outputting a host device type signal; and an interface circuitry in operative communication with the microcomputer for receiving the host device type signal and the acquired data, selecting the at least one interface from the plurality of interfaces in accordance with the host device type signal, and transmitting the acquired data to the at least one host device in accordance with at least one format corresponding to said at least one selected interface, wherein the plurality of interfaces includes a USB interface, and at least two interfaces of the plurality of interfaces are provided on one circuit board;

wherein the microcomputer includes flash memory storing programmable instructions for enabling configuration of the interface circuitry.

2. The interface controller as in claim 1, further comprising a Flash memory for storing a plurality of data translation modules for translating the received data, each of the plurality of data translation modules corresponding to a type of the at least one host device.

3. The interface controller as in claim 1, wherein the interface circuitry comprises a plurality of switches for coupling host-specific outputs from the microcomputer to an output connector of the interface controller.

4. The interface controller as in claim 3, further comprising a multiplexer for receiving the host device type signal from the microcomputer and outputting a plurality of switching signals into the plurality of switches.

5. The interface controller as in claim 1, further comprising a plurality of drivers for driving output signals to voltage levels acceptable by the at least one host device.

6. The interface controller as in claim 1, further comprising a decoder for receiving input data from a scan engine of the data acquisition device and decoding the received input data according to a predetermined symbology.

7. A data acquisition device comprising:
a scan engine for optically acquiring encoded data;
a decoder for receiving input data from the scan engine and decoding the received input data according to a predetermined symbology; and
an interface controller for interfacing the data acquisition device to at least one host device, said interface controller comprising:
a microcomputer for receiving data from the data acquisition device and outputting a host device type signal; and
interface circuitry in operative communication with the microcomputer for receiving the host device type signal and the data received by the microcomputer, selecting at least one interface from a plurality of interfaces in accordance with the host device type signal, and transmitting the received data to the at least one host device in accordance with at least one format corresponding to said at least one selected interface, wherein the plurality of interfaces includes a USB interface, and at least two interfaces of the plurality of interfaces are provided on one circuit board;
wherein the microcomputer includes flash memory storing programmable instructions for enabling configuration of the interface circuitry.

8. The data acquisition device as in claim 7, wherein the microcomputer includes a plurality of translation modules for translating received data from the decoder.

9. The data acquisition device as in claim 8, further comprising a memory for storing the plurality of data translation modules for translating the received data, each of the plurality of data translation modules corresponding to a type of the at least one host device.

10. The data acquisition device as in claim 8, wherein the interface circuitry comprises a plurality of switches for coupling host-specific outputs from the microcomputer to an output connector of the interface controller.

11. The data acquisition device as in claim 10, further comprising a multiplexer for receiving the host device type signal from the microcomputer and outputting a plurality of switching signals into the plurality of switches.

12. The data acquisition device as in claim 8, further comprising a plurality of drivers for driving output signals to voltage levels acceptable by the at least one host device.

13. A data acquisition system comprising:
a data acquisition device for acquiring data;
at least one host device for receiving and processing the acquired data; and
an interface controller for interfacing the data acquisition device to the at least one host device, said interface controller comprising:
a microcomputer for receiving data from the data acquisition device, including the acquired data, and outputting a host device type signal; and
interface circuitry in operative communication with the microcomputer for receiving the host device type signal and the data received by the microcomputer, selecting at least one interface from a plurality of interfaces in accordance with the host device type signal, and transmitting the received data, including the acquired data, to the at least one host device in accordance with at least one format corresponding to said at least one selected interface, wherein the plurality of interfaces includes a USB interface, and at least two interfaces of the plurality of interfaces are provided on one circuit board;
wherein the microcomputer includes flash memory storing programmable instructions for enabling configuration of the interface circuitry.

14. The data acquisition system as in claim 13, wherein the data acquisition device and the interface controller are an integral device.

15. The data acquisition system as in claim 13, wherein the microcomputer includes a plurality of translation modules for translating received data, including the acquired data from the data acquisition device.

16. The data acquisition system as in claim 15, wherein the interface controller further comprises a memory for storing the plurality of data translation modules for translating the acquired data, each of the plurality of data translation modules corresponding to a type of the at least one host device.

17. The data acquisition system as in claim 15, wherein the interface circuitry comprises a plurality of switches for coupling host-specific outputs from the microcomputer to an output connector of the interface controller.

18. The data acquisition device as in claim 17, further comprising a multiplexer for receiving the host device type signal from the microcomputer and outputting a plurality of switching signals into the plurality of switches.

19. The data acquisition device as in claim 15, wherein the interface controller further comprises a plurality of drivers for driving output signals to voltage levels acceptable by the at least one host device.

20. A method for interfacing a data acquisition device to at least one host device, the method comprising the steps of:
coupling the data acquisition device to the at least one host device with an interface controller;
determining a type of the at least one host device; and
configuring the interface controller for translating data received from the data acquisition device to at least one format suitable for being received by the type of the at least one host device, transmitting the translated data from the data acquisition device to the at least one host, wherein the configuring step comprises selecting at least one interface from a plurality of interfaces stored within a memory of the interface controller, wherein the plurality of interfaces includes a USB interface, and at least two interfaces of the plurality of interfaces are provided on one circuit board.

21. The method as in claim 20, further comprising loading from Flash memory a data translation module for translating data acquired by the data acquisition device to the at least one format of the at least one host device.

22. The method as in claim 20, wherein the determining step comprises inputting the type of the at least one host device via the data acquisition device.

23. The method as in claim 22, wherein the inputting step comprises optically scanning the type of the at least one host device.

24. The method as in claim 20, where the determining step comprises performing an autodiscriminate routine to detect if the at least one host device is connected.

25. The method as in claim 20, wherein the configuring step comprises electrically coupling host-specific outputs of the interface controller to the at least one host device.

* * * * *